UNITED STATES PATENT OFFICE.

GEORGE BURKE PALMER, OF NEW YORK, N. Y.

MANUFACTURE OF COLORS.

1,339,219.	Specification of Letters Patent.	Patented May 4, 1920.

No Drawing.	Application filed June 14, 1919. Serial No. 304,273.

*To all whom it may concern:*

Be it known that I, GEORGE BURKE PALMER, a citizen of the United States, and a resident of the borough of Manhattan, city, county, and State of New York, have invented certain new and useful Improvements in the Manufacture of Colors, of which the following is a specification.

The objects of my invention are to produce the pigment which is variously known in the art by its trade names as "iridescent blue," "reflex blue," "rosalin blue," or "refulgent blue," by methods adapted greatly to decrease the time, labor and cost of production and at a considerable saving. The pigment thus produced is characterized by tinctorial power, permanency of color, miscibility and homogeneity equal to those heretofore marketed under the trade names above set forth, and is equally adapted for use as a pigment or color base in the manufacture of printing and lithographic inks, for which it has heretofore been chiefly employed. By reason of the low cost when made by my quick method, it also becomes available for use in the manufacture of lacquers, enamels, stains and the like products for which it has not heretofore been used commercially because of its high cost.

My invention consists in the discovery that the processes heretofore practised in the production of this color pigment may be greatly simplified by the elimination of certain steps deemed by those skilled in the art to be indispensable, but which my discovery enables me to omit without detriment to the product. My improved method further permits the use as a base material of ingredients less advanced in their condition by preliminary treatments which have heretofore been customary, and which ingredients are formed intermediate the production of those dyes which heretofore have been used as the base of the pigment, by the color-maker.

In the manufacture of blues of the types above recited, it has been the standard and exclusive practice to employ the dyes known as alkali blue and soluble blue. These dyes are produced from a rosanilin base which by alkalization yields anilin blue. This anilin blue by sulfonation gives the sulfonic acids of triphenyl-rosanilin and triphenyl-pararosanilin, the monosulfuric acid yielding the alkali blue dye and the di- and tri-sulfonic acids yielding the soluble blue dye upon further treatment. The next step in this treatment is that known to those skilled in the art as drowning. The drowning process consists in dissolving the sulfonic acid in concentrated sulfuric acid, and pouring this solution into an agitation tank containing water whose temperature is approximately 8° to 10° C. lower than that of the solution itself, which for comparison is assumed to be approximately at atmospheric temperature. Precipitation of the sulfonic acid results, leaving the dye ingredient in a pulp form known in the dye art as "worms." The dye maker then subjects this pulp to further treatment, the next step being filtration, after which the filtered pulp is (1) dissolved in a solution of soda. From this soda solution, the solvent is (2) evaporated. The separated dye is next (3) dried and then (4) ground, standardized and packed, and becomes a commercial dye stuff, either as the alkali blue dye or the soluble blue dye desired. This dye stuff is the material heretofore employed as the base material for the production of the specific blues first named, *i. e.* "reflex blue," etc., and whose production is the object of this invention.

Heretofore it has been necessary for the color maker to treat these dye stuffs as follows:

(5) To test the dye for moisture content and color shade, (6) To make a solution thereof, (7) To precipitate it with sulfuric acid, (8) To boil it, (9) To neutralize the free acid,

(10) To filter it, and then to mix it with varnish, oil or the like, to extract the water content by milling, and to standardize and package the product.

Thus, briefly stated, the production of the desired product included the work of the two separate manufactures, first of the dye stuff, and second of the pigment therefrom.

My invention consists in the discovery that the product obtained by the dye maker as the result of the drowning step in the production of alkali blue or soluble blue dyes, and which pulp product is known, as above stated, as "worms," may be used directly by the color maker in the production of the blue of which "reflex blue" is the commonest type. I have discovered that substantially all the above enumerated steps of the process heretofore employed to produce the dye stuffs named may be dispensed with in the production of pigments as such. Specifically, I omit the above steps numbered from (1) to (10) inclusive, as I have discovered that upon filtration of the worms, it is only necessary to test the pulp for moisture content and color shade and then to incorporate with a suitable vehicle such as varnish or oil, extract the water content by milling, standardize and package. The incorporation of oil or varnish vehicles is determined as to quantity by the color strength desired, the ratio of varnish to pigment varying from two parts of varnish and one of pigment to equal parts of each, dependent upon the ascertained moisture content of the pulp, as will be understood by those skilled in the art. The testing for shade determines the need for grinding and its standardization, as will also be obvious to color makers.

It will thus be seen that my method differs from the described prior method by the elimination of lengthy and costly operations: first, those of the dye manufacturer, enumerated above as steps (1) to (4), in forming a sodium compound of the sulfonic acid which has to be mixed, evaporated, dried, ground and standardized; and second, those of the pigment manufacturer, enumerated above as steps (5) to (10), in testing and making a solution and a precipitation of the dye, boiling, neutralizing and making a filtration of the color formed, which operations entail losses of material necessary in performing them. Thus there is a direct saving of the values of the materials used in the above operations in both the dye and the pigment manufacture, as well as a saving of all the labor and expense entailed in the omitted operations.

Having thus described my invention or discovery, I claim:

1. The method of manufacturing color pigment consisting in filtration of the sulfonic acid-derived pulp known as worms, and incorporation of a color carrier therewith.

2. The method of manufacturing color pigment consisting in filtration of the sulfonic acid-derived pulp known as worms, incorporation of a color carrier therewith, and extraction of the water content.

3. The method of making a color pigment from the sulfonic acid-derived pulp known as worms consisting in drowning the sulfonic acid of triphenyl-pararosanilin, filtering the resultant pulp, incorporating a color vehicle therewith, and drying the mixture.

4. The method of making the blue pigment derived from the sulfonic acids of triphenyl-pararosanilin and triphenyl-rosanilin consisting in filtering the pulp resultant from drowning said acids, testing said pulp for moisture content, incorporating varnish therewith in proportions determined by said moisture content, and milling the mixture to extract said moisture.

5. The method of making color pigment consisting in incorporating with one part of filtered worms, resultant from drowning a sulfonic acid of anilin blue, from one to two parts of varnish, drying the mixture, and grinding same.

GEORGE BURKE PALMER.